United States Patent
Kondo et al.

[11] Patent Number: 5,897,145
[45] Date of Patent: Apr. 27, 1999

[54] CONNECTOR

[75] Inventors: Masashi Kondo, Komaki; Kazuhiro Kato, Nagoya; Tomohide Ito; Koyo Fujimori, both of Kasugai, all of Japan

[73] Assignee: Tokai Rubber Industries, Ltd., Komaki, Japan

[21] Appl. No.: 08/864,862

[22] Filed: May 29, 1997

[30] Foreign Application Priority Data

Dec. 5, 1996 [JP] Japan ................................. 8-325651

[51] Int. Cl.$^6$ .................................................. F16L 35/00
[52] U.S. Cl. .......................... 285/93; 285/38; 285/319; 285/423; 285/921
[58] Field of Search ........................... 285/38, 93, 305, 285/319, 921, 24, 27, 423

[56] References Cited

U.S. PATENT DOCUMENTS

4,946,205  8/1990  Washizu .
5,152,555  10/1992  Szabo .

*Primary Examiner*—Dave W. Arola
*Attorney, Agent, or Firm*—Jacobson, Price, Holman & Stern, PLLC

[57] ABSTRACT

A connector includes a tube-shaped male member, a female member, an engagement member, and a checking member. The male member has a ring-shaped convexity. The female member has a substantially cylinder-shaped housing. The housing has a pair of widows having a peripheral end and a peripheral edge. The checking member has a letter C-shaped portion, and a pair of engagement convexities. The engagement convexities has a first engaging portion, a leading-end contacting portion, and an inclined second engaging portion. The first engaging portion engages with the peripheral end of the windows of the housing so as to inhibit the checking member from coming off from the housing in a direction perpendicular to an axial direction before the male member is connected with the female member. The leading-end contacting portion is pressed by the ring-shaped convexity to move outwardly in a radial direction so as to diametrically enlarge the letter C-shaped portion when the fitting of the male member is completed. The inclined second engaging portion engages with the peripheral edge of the windows of the housing so as to inhibit the checking member from coming off from the housing in a direction perpendicular to an axial direction by an elastic restoring force of the letter C-shaped portion when the fitting of the male member is completed.

4 Claims, 8 Drawing Sheets

CONNECTOR

BACKGROUND OF THE INVENTION

1. Field of the Invention

The present invention relates to a connector for piping hoses, pipes, and the like. More particularly, the present invention relates to a connector in which the connection between a male member and a female member can be checked.

2. Description of the Related Art

Figure 15:
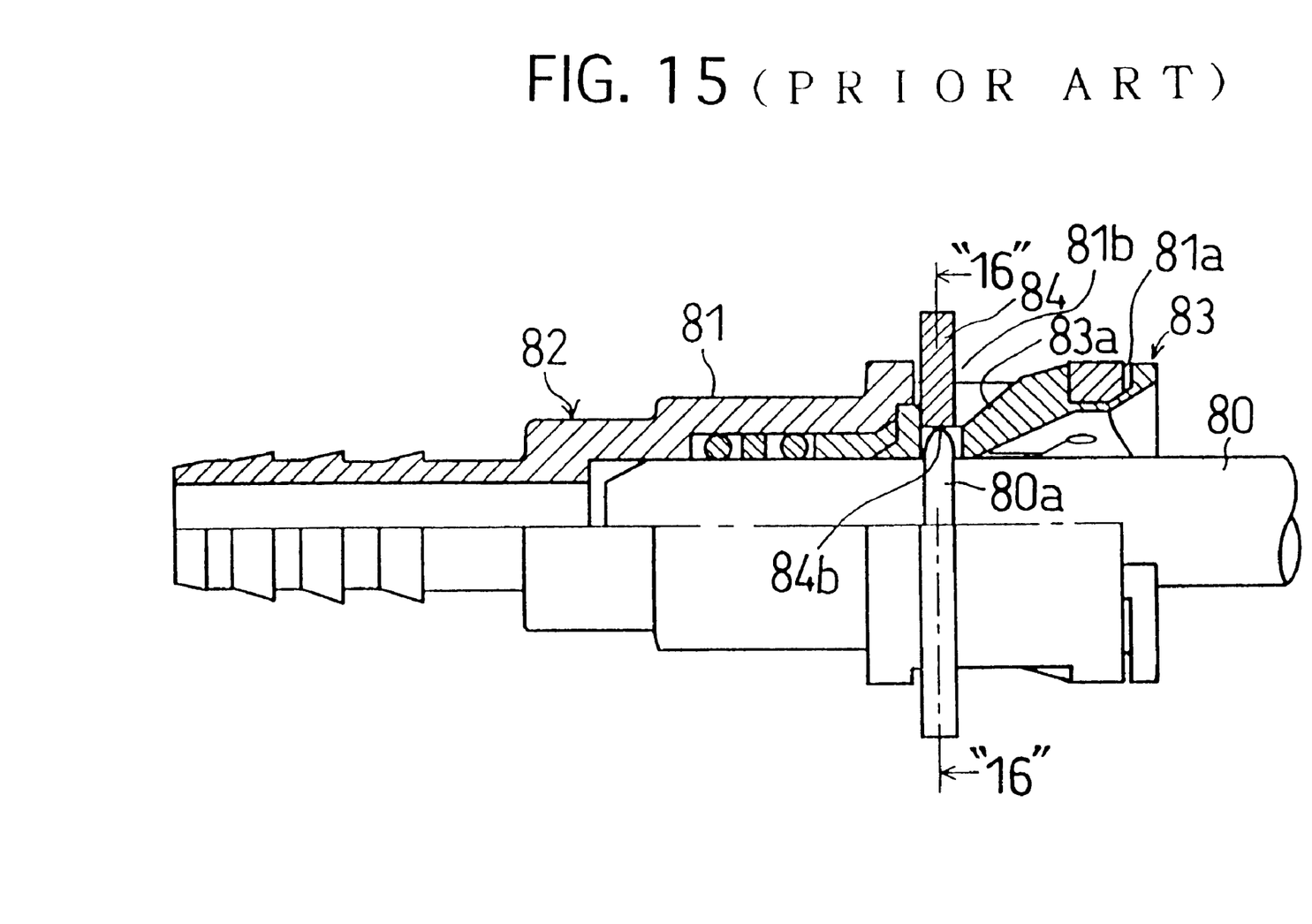
FIG. 15 is concerned with a conventional connector, and is a cross-sectional view for illustrating the completion of the fitting of a male member thereof into a female member thereof.
Figure 16:
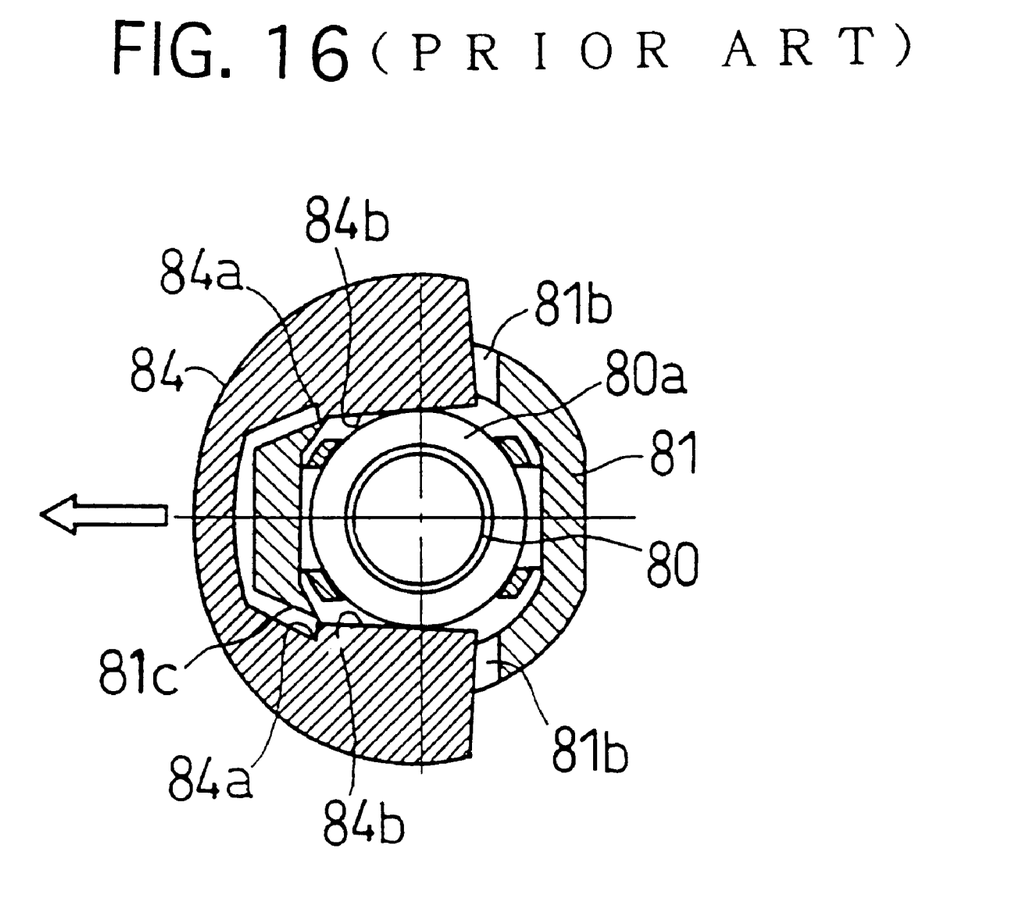
FIG. 16 is concerned with the conventional connector, and is a cross-sectional view taken along arrow "16"—"16" of FIG. 15.

As one of connectors for connecting hoses, a connector as illustrated FIGS. 15 and 16 has been known conventionally. The conventional connector includes a pipe-shaped male member 80, a female member 82, an engagement member 83, and a checking member 84. The male member 80 is provided with a ring-shaped convexity 80a which is disposed at a position away from the leading end by a predetermined distance, and which projects in a centrifugal direction. The female member 82 is provided with a substantially cylinder-shaped housing 81 which has a fitting opening end 81a, and into which the male member 80 is fitted. The engagement member 83 is fitted into the housing 81 and held at an end on the side of the fitting opening 81a of the housing 81, thereby connecting the male member 80, fitted into the housing 81, with the female member 82. The checking member 84 is assembled externally around and held onto an outer periphery of the housing 81 in a direction perpendicularly to an axial direction, and is designed to check whether the male member 81 is connected with the female member 82.

Further, at an end on the side of the fitting opening end 81a of the housing 81, there are formed a pair of windows 81b which penetrate through in a radial direction and face each other in a peripheral direction. Furthermore, the engagement member 83 has a pair of claws 83a which are capable of elastically deforming in a radial direction, and which are disposed at positions corresponding to the windows 81b. Moreover, as illustrated in FIG. 16, the checking member 84 is formed as a letter C-shape which is capable of diametrically enlarging by elastic deformation. The checking member 84 is fitted into a cut-off groove 81c which is formed continuously from an end of the windows 81b of the housing 81, and is thereby assembled externally around and held onto an outer periphery of the housing 81 in a direction perpendicular to an axial direction. In addition, the checking member 84 has a pair of engagement concavities 84a, 84a, and a pair of leading-end contacting portions 84b, 84b. Before the male member 80 is connected with the female member 82, the engagement concavities 84a, 84a engage with a peripheral edge of the windows 81b, 81b so that they inhibit the checking member 84 from coming off from the housing 81 in a direction perpendicularly to an axial direction. The leading-end contacting portions 84b, 84b are brought into contact with an outer periphery of the ring-shaped convexity 80a of the male member 80 when the male member 80 is fitted into the housing 81 of the female member 82.

In the conventional connector, the checking member 84 is assembled from the outside in a direction perpendicular to an axial direction, and is held onto an outer peripheral surface of the housing 81 of the female member 82 before the male member 80 is connected with the female member 82. Thus, the engagement concavities 84a, 84a of the checking member 84 are engaged with the peripheral edge of the windows 81b, 81b. At the same time, the leading-end contacting portions 84b, 84b of the checking member 84 are fitted into the windows 81b, 81b, and are placed at an axially inner position with respect to the claws 83a, 83a of the engagement member 83. Under the circumstances, the ring-shaped convexity 80a of the male member 80 presses and enlarges the claws 83a, 83a of the engagement member 83 outwardly in a radial direction against their elasticity when the male member 80 is fitted into the housing 81 of the female member 82. Eventually, the ring-shaped convexity 80a goes beyond the claws 83a, 83a. Thus, the leading end of the claws 83a, 83a engages with the ring-shaped convexity 80a to put the male member 80 and the female member 81 into the connected state. In the connected state (i.e., the state illustrated in FIGS. 15 and 16), the ring-shaped convexity 80a of the male member 80 presses and enlarges the leading-end contacting portion 84b, 84b of the checking member 84 outwardly in a radial direction. Accordingly, the leading-end contacting portions 84b, 84b of the checking member 84 come off from the peripheral edge of the windows 81b, 81b. As a result, the checking member 84 is projected by the elasticity in a direction perpendicular to an axial direction (i.e., the direction specified by the arrow of FIG. 16) so that it comes off from the housing 81 of the female member 82. Hence, it is possible to check whether the male member 80 is connected with the female member 82.

As described so far, in the conventional connector, the checking member 84 comes off from the housing 81 of the female member 82 by the elastic restoring force in a direction perpendicular to an axial direction when the male member 80 is connected with the female member 82. Thus, the conventional connector enables an operator to check whether the male member 80 is connected with the female member 82.

Note that, in the conventional connector, the following arrangements are devised in order to make the checking member 84 likely to come off from the housing 81 of the female member 82 in a direction perpendicular to an axial direction: the housing 81 is provided with the cut-off groove 81 so as to reduce a peripheral width between side walls of the housing 81 over which the checking member 84 extends; or an intermediate member is disposed independently on an inner-surface side of the leading-end contacting portions 84b, 84b of the checking member 84 so as to press and enlarge the leading-end contacting portions 84b, 84b of the checking member 84 by the ring-shaped convexity 80a via the intermediate member.

However, when the checking member 84 projects and comes off from the housing 81 of the female member 82 by the elastic restoring force simultaneously with the connection of the male member 80 with the female member 82, it is needed to pick up the checking member 84 which has come off from the housing 81 after the connecting operation. Accordingly, depending on the places where the conventional connector is applied, it is extremely difficult to carry out the picking-up operation. Moreover, the conventional connector cannot be applied to the places where the come-off and fallen checking member 84 results in troubles.

SUMMARY OF THE INVENTION

The present invention has been developed in view of the circumstances described above. It is therefore an object of the present invention to provide a connector whose checking member hardly projects by the elasticity after a male member and a female member are connected.

A connector according to the present invention can carry out the object, and comprises:

a tube-shaped male member having a leading end, and a fitting end, the fitting end being provided with a ring-shaped convexity which is disposed at a position away from the leading end by a predetermined distance, and which projects in a centrifugal direction;

a female member having axially opposite ends, and a substantially cylinder-shaped housing disposed at one of the axially opposite ends, the housing being provided with a fitting opening end into which the fitting end of the male member is fitted, and a pair of windows which penetrate through in a radial direction and face oppositely with each other in a peripheral direction, and which has a peripheral end and a peripheral edge;

an engagement member being fitted into and held in the housing of the female member, and having a pair of claws, the claws being capable of elastically deforming in a radial direction, being disposed at positions which correspond to the windows of the housing, and being provided with an inclined inner surface and an engagement end, the inclined inner surface which is inclined inwardly in a radial direction as it extends from the fitting opening end of the housing to an axial inner side, and on which the ring-shaped convexity of the male member is pressed to slide when the male member is fitted into the female member, the engagement end which is engaged with the ring-shaped convexity of the male member so as to inhibit the male member from coming off when the male member and the female member are connected; and a checking member assembled externally around and held onto an outer periphery of the housing of the female member in a direction perpendicular to an axial direction, and having a letter C-shaped portion, and a pair of engagement convexities, the letter C-shaped portion having opposite ends, and being capable of diametrically enlarging by elastic deformation, the engagement convexities projecting inwardly from and integrally with the opposite ends of the letter C-shaped portion, and being fitted into the housing through the windows of the housing at positions which are disposed on a further axially inner side in the housing with respect to the engagement end of the claws of the engagement member;

the engagement convexities of the checking member having a first engaging portion, a leading-end contacting portion, and an inclined second engaging portion, the first engaging portion engaging with the peripheral end of the windows of the housing of the female member so as to inhibit the checking member from coming off from the housing in a direction perpendicular to an axial direction before the male member is connected with the female member, the leading-end contacting portion being positioned within a locus of the ring-shaped convexity of the male member during the fitting of the male member and before the male member is connected with the female member, being pressed by the ring-shaped convexity to move outwardly in a radial direction so as to diametrically enlarge the letter C-shaped portion of the checking member when the fitting of the male member is completed, the inclined second engaging portion engaging with the peripheral edge of the windows of the housing of the female member so as to inhibit the checking member from coming off from the housing in a direction perpendicular to an axial direction by an elastic restoring force of the letter C-shaped portion when the fitting of the male member is completed, and being inclined inwardly in a substantially centripetal direction of the housing so as to further diametrically enlarge the letter C-shaped portion by being brought into sliding contact with the peripheral edge of the windows of the housing when the checking member is pulled out from the housing in a direction perpendicular to an axial direction after the fitting of the male member is completed.

Note that, in the present specification, the term "axial direction" means an axial direction of the female member, and the term "peripheral direction" means a peripheral direction of the female member.

In the present connector, the checking member is assembled externally around and held onto an outer peripheral surface of the housing of the female member in a direction perpendicular to an axial direction before the male member is connected with the female member. At this moment, the engagement convexities of the checking member are fitted into the housing of the female member through the windows of the housing at positions which are disposed on a further axially inner side in the housing with respect to the engagement end of the claws of the engagement member. At the same time, the first engaging portion of the engagement convexities of the checking member engages with the peripheral end of the windows of the housing. Accordingly, the checking member can be securely inhibited from coming off from the housing in a direction perpendicularly to an axial direction, because the first engaging portion of the engagement convexities engages with the peripheral end of the windows. In this instance, the checking member cannot be pulled out from the housing in a direction perpendicular to an axial direction even if an operator tries to pull out the checking member from the housing in a direction perpendicular to an axial direction. Moreover, in this instance, the leading-end contacting portion of the engagement convexities of the checking member is positioned within the locus of the ring-shaped convexity of the male member during the fitting of the male member.

When the fitting end of the male member is fitted into the housing of the female member through the fitting opening end, the ring-shaped convexity of the male member presses and slides on the inclined inner surface of the claws of the engagement member, and thereby it pushes and enlarges the claws of the engagement member outwardly in a radial direction against their elasticity to eventually go beyond them. Consequently, the claws elastically restore inwardly in a radial direction, and thereby the engagement end of the claws of the engagement member engages with the ring-shaped convexity of the male member. Thus, the male member and the female member are connected by way of the engagement member.

When the fitting of the male member is completed, the leading-end contacting portion of the engagement convexities of the checking member, which has been positioned within the locus of the ring-shaped convexity of the male member, is pressed by the ring-shaped convexity to move outwardly in a radial direction, and thereby the letter C-shaped portion of the checking member is enlarged diametrically. When the letter C-shaped portion is thus enlarged diametrically, the inclined second engaging portion of the engagement convexities of the checking member is brought into contact with and engaged with the peripheral edge of the windows of the housing of the female member. Accordingly, the checking member can be securely inhibited from coming off from the housing of the female member in a direction perpendicular to an axial direction by an elastic restoring force of the letter C-shaped portion, because the inclined second engaging portion of the engagement convexities of the checking member engages with the peripheral edge of the windows.

Under the circumstance, when an operator tries to pull out the checking member from the housing of the female member in a direction perpendicular to an axial direction, the letter C-shaped portion of the checking member is further enlarged diametrically by means of the sliding contact between the inclined second engaging portion of the engagement convexities of the checking member and the peripheral edge of the windows of the housing. Consequently, the checking member can be readily pulled out from the housing in a direction perpendicular to an axial direction. As a result, it is possible to check the connection between the male member and the female member.

Thus, in the present connector, the checking member hardly projects out and comes off from the housing of the female member by its own elastic restoring force after the male member is connected with the female member. Accordingly, the present connector can obviate the conventional troublesome operation in which an operator should pick up a conventional checking member, having been disassembled and fallen from the housing, after completing the connection.

As having described so far, in accordance with the present connector, there is no fear that the checking member projects out and comes off from the housing of the female member by its own elastic restoring force after the male member is connected with the female member. Consequently, it is unnecessary for an operator to pick up the checking member after completing the connection, because the checking member of the present connector is hardly disassembled and fallen from the housing. As a result, the present connector can be applied to places where a come-off and fallen checking member results in troubles, and where it is extremely difficult for an operator to pick up a come-off and fallen checking member.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

The specific preferred embodiments according to the present invention will be hereinafter described in detail with reference to the drawings.

First Preferred Embodiment

A connector according of a First Preferred Embodiment according to the present invention illustrated in FIGS. 1 through 10 includes a tube-shaped male member 1, a substantially-cylinder-shaped female member 3, an engagement member 4, and a checking member 5. The female member 3 is fixed to one of the opposite ends of a hose 2 which is formed of rubber, a resin tube, or the like. The engagement member 4 is assembled within the female member 3, and connects the male member 1, which is fitted into the female member 3, with the female member 3. The checking member 5 is assembled externally around and held onto the female member 3, and is made to check whether the male member 1 is connected with the female member 3.

Figure 8:
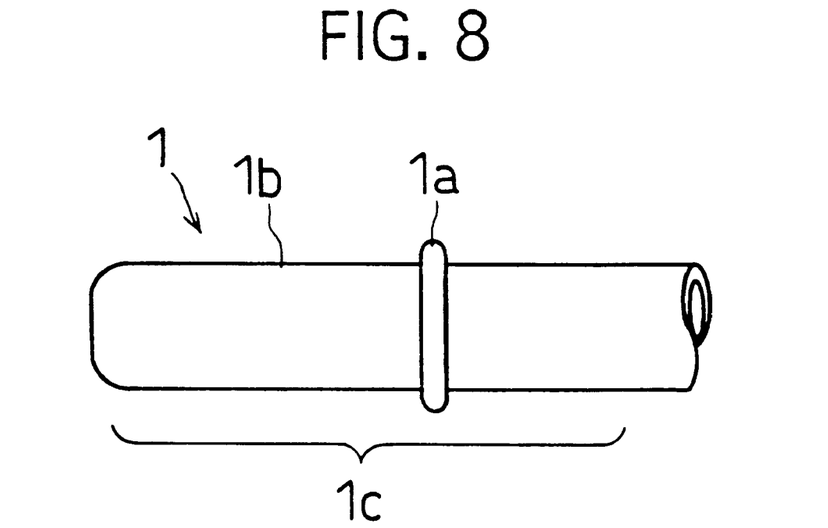
FIG. 8 is concerned with the First Preferred Embodiment of the present connector, and is a side view of a male member thereof.

The male member 1 is formed of a pipe which is made from metal or resin. As illustrated in FIG. 8, the male member 1 is provided with a ring-shaped convexity 1a and a fitting end 1c. The ring-shaped convexity 1a is disposed at a position away from the leading end of the male member 1 by a predetermined distance, and projects in a centrifugal direction. The fitting end 1c is provided with a leading-end portion 1*b* which is positioned on a front-end side with respect to the ring-shaped convexity 1*a*.

Figure 1:
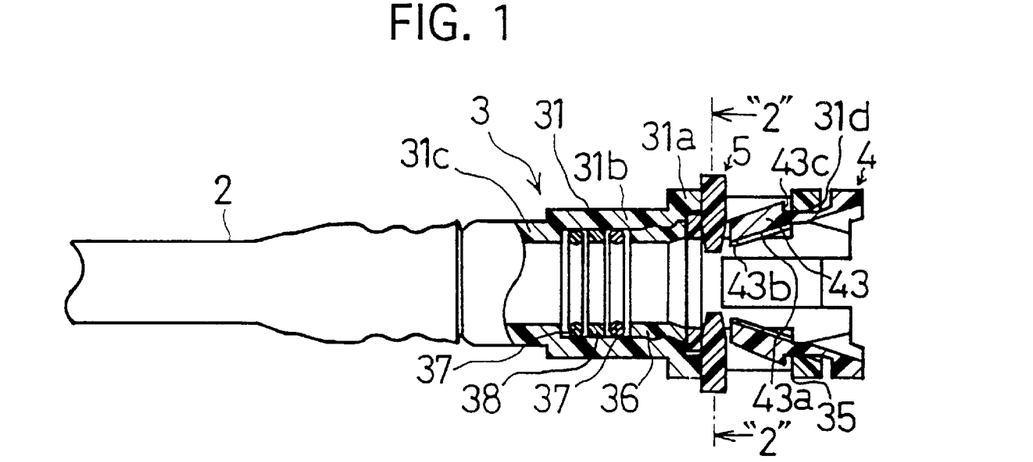
FIG. 1 is concerned with a First Preferred Embodiment of the present connector, and is a cross-sectional view of a female member thereof before a male member thereof is fitted into the female member.
Figure 9:
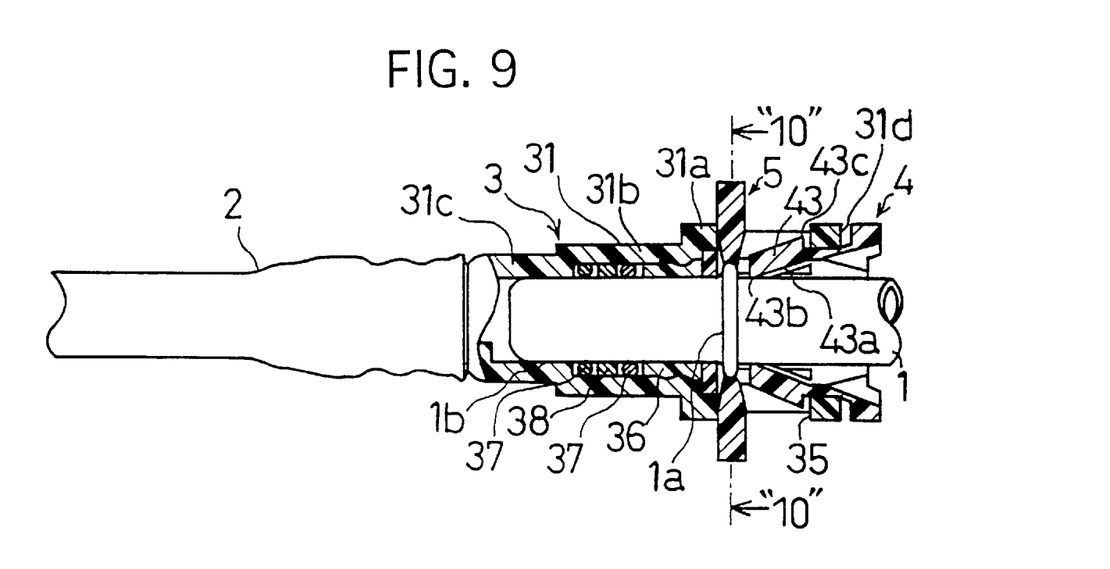
FIG. 9 is concerned with the First Preferred Embodiment of the present connector, and is a cross-sectional view for illustrating the completion of the fitting of the male member into the female member.

The female member 3 is formed of resin, for example, Nylon (Trade Mark). As illustrated in FIGS. 1 and 9, the female member 3 includes a housing 31, and a hose-connecting end. The housing 31 is placed at one of the opposite ends on the axial-end side of the female member 3 (hereinafter understood as "on the right side of FIGS. 1 and 9" unless otherwise specified). The hose-connecting end is placed at another one of the axial ends (hereinafter understood as "on the left side of FIGS. 1 and 9" unless otherwise specified), and is disposed coaxially with the housing 31. Further, the housing 31 includes a major-diameter portion 31*a*, an intermediate-diameter portion 31*b*, and a minor-diameter portion 31*c* which are placed in this order from one of the axial ends, and which are disposed coaxially with each other. Furthermore, the housing 31 has a fitting opening end 31*d* at one of the opposite ends on the axial-end side of the female member 3. Into the fitting opening end 31*d*, the fitting end 1*c* of the male member 1 is fitted. Moreover, the hose-connecting end has an axial hole, an annular groove, and two steps. The axial hole is defined by the inner peripheral surface of the hose-connecting end. The annular groove and the two steps are formed on the outer peripheral surface of the hose-connecting end. The two steps inhibit the hose 2 from coming off. In the annular groove, a ring-shaped sealing member is disposed so as to seal the inner peripheral surface of the hose 2. Finally, the hose 2 is assembled externally around the outer peripheral surface of the hose-connecting end.

Figure 2:
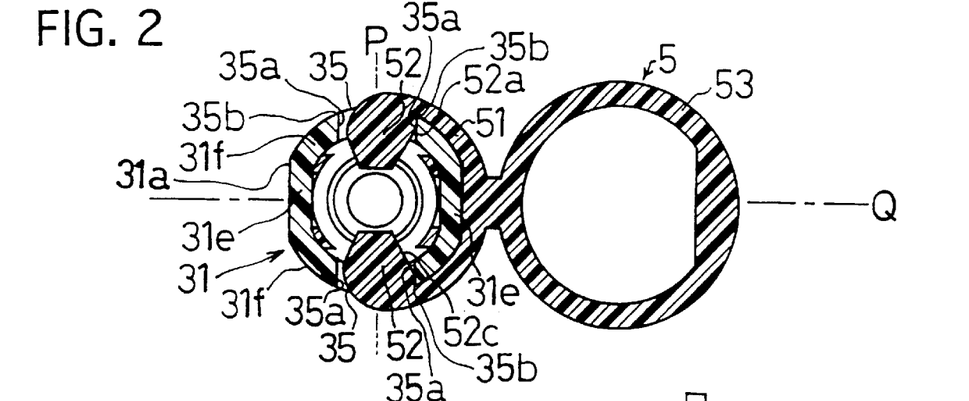
FIG. 2 is concerned with the First Preferred Embodiment of the present connector, and is a cross-sectional view taken along arrow "2"—"2" of FIG. 1.
Figure 10:
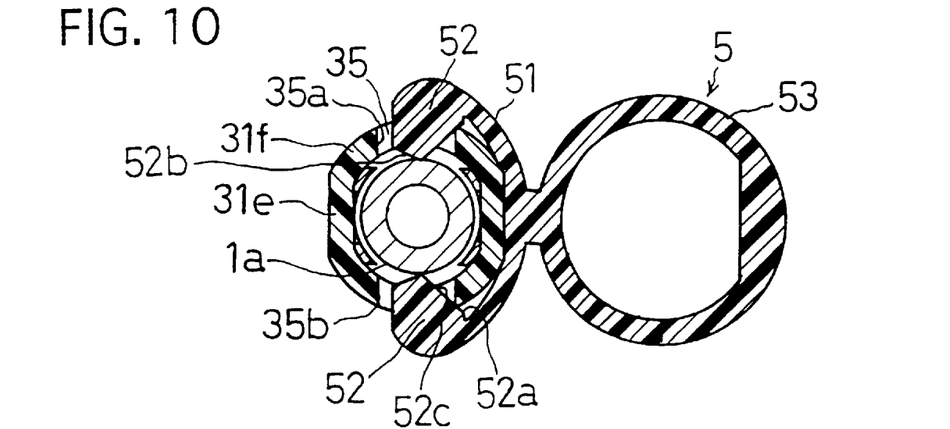
FIG. 10 is concerned with the First Preferred Embodiment of the present connector, and is a cross-sectional view taken along arrow "10"—"10" of FIG. 9.

As illustrated in FIGS. 2 and 10, the major-diameter portion 31*a* of the housing 31 includes a pair of flat walls 31*e*, 31*e*, and a pair of arc walls 31*f*, 31*f*. The flat walls 31*e*, 31*e* extend parallel to each other. The arc walls 31*f*, 31*f* connects the top end of the flat walls 31*e*, 31*e* with the bottom end thereof integrally. Moreover, in peripheral central portions of the arc walls 31*f*, 31*f*, there are formed rectangle-shaped windows 35, 35 which are penetrated through in a radial direction, and which are disposed to face each other in a peripheral direction.

In the housing 31 of the female member 3, a central axis extends parallel to the facing direction of the windows 35, 35 which are disposed to face each other in a peripheral direction. Let a first symmetric axis P (referred to as a "first central axis" in the appended claims) be the central axis, and an axis, which crosses the first symmetric axis P perpendicularly, be a second symmetric axis Q (referred to as a "second central axis" in the appended claims). In an axially-perpendicular cross-section of the housing 31, the flat walls 31*e*, 31*e* extend parallel to the first symmetric axis P. The two sets of the peripheral ends 35*a*, 35*a* of the two windows 35, 35 constitute opposite parallel surfaces which extend parallel to the first symmetric axis P. Moreover, the two windows 35, 35 are formed symmetric with respect to the second symmetric axis Q. With these arrangements, the major-diameter portion 31*a* of the housing 31 (i.e., part of the female member 3 involving the housing 31) is formed as a symmetric configuration not only with respect to the first symmetric axis P, but also with respect to the second symmetric axis Q. As hereinafter described, since the checking member 5 is also formed as a symmetric configuration with respect to the second symmetric axis Q as can be seen from FIG. 2, it is thus possible to install the checking member 5 onto the housing 31 either from the right side of FIG. 2 or from the left side thereof.

On the inner peripheral surface of the intermediate-diameter portion 31*b*, a cylinder-shaped collar member 36 of longer length, a ring-shaped sealing member 37, a cylinder-shaped collar member 38 of shorter length, and a ring-shaped sealing member 37 are disposed in this order from one of the axial ends. The ring-shaped sealing member 37 seals the outer peripheral surface of the leading-end portion 1*b* of the fitting end 1*c* of the male member 1 which is fitted into the housing 31 of the female member 3. The other ring-shaped sealing member 37 also seals the outer peripheral surface of the leading-end portion 1*b*. Moreover, the inner peripheral surface of the minor-diameter portion 31*c* constitutes an engaging inner peripheral surface. The engaging inner peripheral surface engages with the outer peripheral surface of the leading-end portion 1*b* of the fitting end 1*c* of the male member 1 which is fitted into the housing 31.

Figure 7:
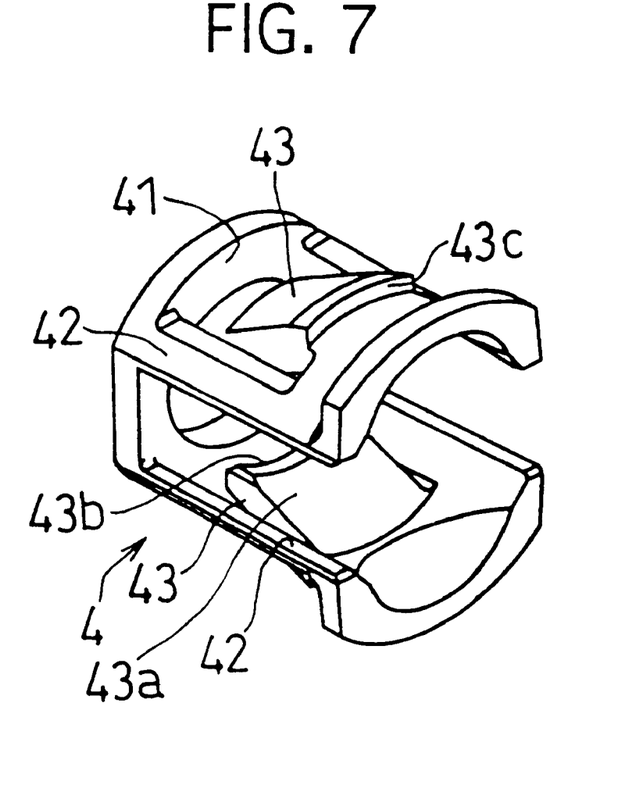
FIG. 7 is concerned with the First Preferred Embodiment of the present connector, and is a perspective view of an engagement member thereof.

The engagement member 4 is formed of elastically deformable resin (e.g., Nylon (Trade Mark)), and is fitted into and held in the major-diameter portion 31*a* of the housing 31 of the female member 3. As illustrated in FIG. 7, the engagement member 4 includes an annular collar 41, a pair of letter U-shaped portions 42, 42, and a pair of claws 43, 43. The letter U-shaped portions 42, 42 are protruded from the annular collar 41 so as to face with each other. The claws 43, 43 are protruded from the letter U-shaped portions 42, 42 so as to incline inwardly with respect to the axial center line in a radial direction, respectively, and are elastically deformable in a radial direction. Moreover, each of the claws 43, 43 is provided with an inclined inner surface 43*a*, an engagement end 43*b* and an engagement step 43*c*. The inclined inner surface 43*a* is inclined inwardly in a radial direction as it extends from the fitting opening end 31 of the housing 31 to an axial inner side when the engagement member 4 is fitted into and held in the housing 31, and is pressed slidably by the ring-shaped convexity 1*a* of the male member 1 when the male member 1 is fitted into the female member 3. The engagement end 43*b* is engaged with the ring-shaped convexity 1*a* of the male member 1 so as to inhibit the male member 1 from coming off when the male member 1 and the female member 3 are connected. The engagement step 43*c* is engaged with the peripheral end 35*a* of the windows 35, 35 of the housing 31 so as to inhibit the engagement member 4 from coming off. Note that, considering the readiness of fitting the engagement member 4 into the housing 31, the engagement member 4 is held with respect to the housing 31 in a manner relatively movable in an axial direction.

Figure 4:
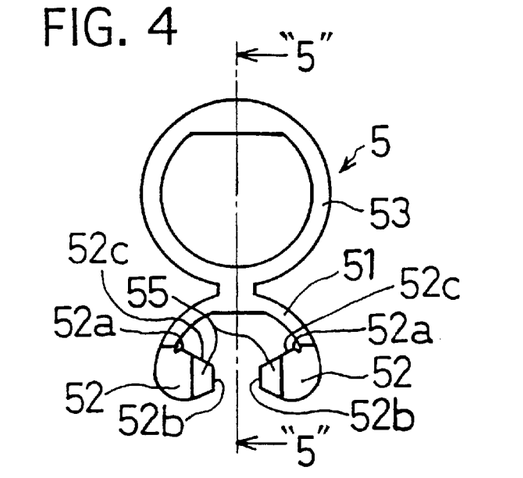
FIG. 4 is concerned with the First Preferred Embodiment of the present connector, and is a front view of a checking member thereof.
Figure 5:
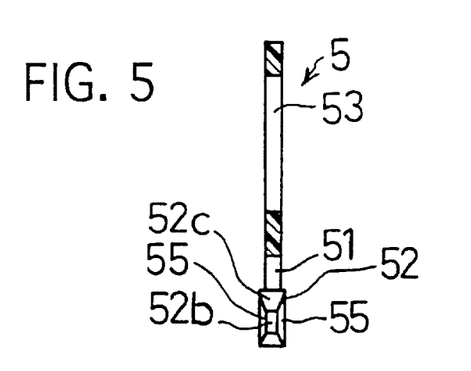
FIG. 5 is concerned with the First Preferred Embodiment of the present connector, and is a cross-sectional view taken along arrow "5"—"5" of FIG. 4.
Figure 6:
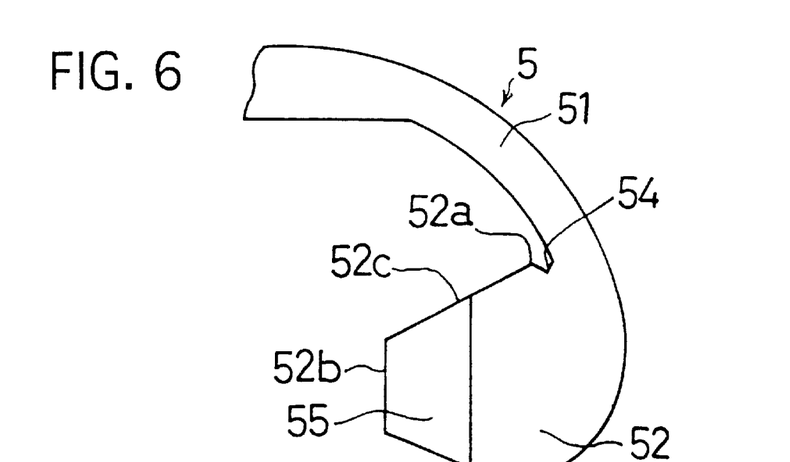
FIG. 6 is concerned with the First Preferred Embodiment of the present connector, and is a partially-enlarged view of the checking member.

As illustrated in FIGS. 4 through 6, the checking member 5 includes a letter C-shaped portion 51, and a pair of engagement convexities 52, 52, and a ring-shaped grip 53. The letter C-shaped portion 51 is capable of diametrically expanding by elastic deformation. The engagement convexities 52, 52 project inwardly from and integrally with the opposite ends of the letter C-shaped portion 51. The ring-shaped grip 53 extends from a peripheral central portion of the letter C-shaped portion 51 outwardly in a radial direction, and is for hooking a hand or a finger when an operator pulls the checking member 5 out from the housing 31 of the female member 3. Note that the letter C-shaped portion 51, the engagement convexities 52, 52, and the grip 53 are formed integrally.

As illustrated in FIG. 2, the checking member 5 can be installed to the housing 31 of the female member 3 as follows: the letter C-shaped portion 51 is enlarged diametrically. The engagement convexities 52, 52, which are disposed at opposite ends of the letter C-shaped portion 51, are fitted into housing 31 through the windows 35, 35 of the housing 31. The inner peripheral configuration of the letter C-shaped portion 51 conforms to the outer peripheral configuration of the major-diameter portion 31a of the housing 31. Consequently, as described later, the inner peripheral surface of the letter C-shaped portion 51 is put into pressed close contact with the outer peripheral surface of the major-diameter portion 31a when the checking member 5 is assembled externally around and held onto the housing 31. As can be appreciated from FIG. 4, the checking member 5 is formed as a symmetric configuration with respect to a symmetric axis that is constituted by a center line (i.e., the line "5"—"5" of FIG. 4) which passes the peripheral center of the letter C-shaped portion 51 and the center between the engagement convexities 52, 52.

As illustrated in FIG. 4, the engagement convexities 52, 52 of the checking member 5 include first engaging portions 52a, 52a, leading-end contacting portions 52b, 52b, and inclined second engaging portions 52c, 52c. The first engaging portions 52a, 52a engage with the peripheral ends 35a, 35a of the windows 35, 35 of the housing 31 of the female member 3 before the male member 1 is connected with the female member 3, thereby inhibiting the checking member 5 from being pulled out from the housing 31 in a direction perpendicular to an axial direction (e.g., "in the direction of the second symmetric axis Q of FIG. 2" unless otherwise specified). The leading-end contacting portions 52b, 52b are positioned within a locus of the ring-shaped convexity 1a of the male member 1 during the fitting of the male member 1 and before the male member 1 is connected with the female member 3. Moreover, the leading-end contacting portions 52b, 52b are pressed by the ring-shaped convexity 1a of the male member 1 to move outwardly in a radial direction so as to diametrically enlarge the letter C-shaped portion 51 of the checking member 5 when the fitting of the male member 1 is completed. The inclined second engaging portions 52c, 52c engage with peripheral edges 35b, 35b of the windows 35, 35 of the housing 31 so as to inhibit the checking member 5 from coming off from the housing 31 of the female member 3 in a direction perpendicular to an axial direction by an elastic restoring force of the letter C-shaped portion 51 of the checking member 5 when the fitting of the male member 1 is completed. Moreover, the inclined second engaging portions 52c, 52c are inclined inwardly in a substantially centripetal direction of the housing 31 so as to further diametrically enlarge the letter C-shaped portion 51 by sliding on the peripheral edges 35b, 35b of the windows 35, 35 of the housing 31 when the checking member 5 is pulled out from the housing 31 of the female member 3 in a direction perpendicular to an axial direction after the fitting of the male member 1 is completed.

Note that, when the checking member 5 is assembled externally around and held onto the housing 31 of the female member 3, the engagement convexities 52, 52 of the checking member 5 are respectively fitted into the housing 31 through the windows 35, 35 at positions which are disposed on a further axially inner side in the housing 31 with respect to the engagement ends 43b, 43b of the claws 43, 43 of the engagement member 4. Moreover, in the First Preferred Embodiment, the leading-end contacting portions 52b, 52b of the engagement convexities 52, 52 of the checking member 5 are advanced to positions in the housing 31 where they can be brought into slidable contact with the outer peripheral surface of the leading-end portion 1b of the male member 1, which is fitted into the housing 31, when the checking member 5 is assembled externally around and held onto the housing 31 and before the male member 1 is connected with female member 3.

As illustrated in FIG. 6, in the checking member 5 of the connector according to the First Preferred Embodiment, a concave-shaped cut-off 54 is formed at the base end (i.e., the boundary between the engagement convexities 52, 52 and the letter C-shaped portion 51) of the engagement convexities 52, 52 on the side of letter C-shaped portion 51 (i.e., the upper side of FIGS. 4 and 6). The boundaries between the cut-offs 54, 54 and the inclined second engaging portions 52c, 52c are thus made to work as the first engaging portions 52a, 52a.

In addition, in the connector according to the First Preferred Embodiment, as can be understood from FIG. 2, the letter C-shaped portion 51 of the checking member 5, the housing 31 of the female member 3, etc., are designed dimensionally so that a first distance between a first line, which connects the peripheral ends 35a, 35a of the windows 35, 35 of the housing 31 of the female member 3, and the outer surface of the flat walls 31e, 31e of the housing 31 is slightly larger than a second distance between a second line, which connects the first engaging portions 52a, 52a of the checking member 5, and the flat inner surface of the letter C-shaped portion 51 of the checking member 5.

With these extra arrangements, when the checking member 5 is assembled externally around and held onto the housing 31, specifically when the first engaging portions 52a, 52a of the engagement convexities 52, 52 of the checking member 5 are engaged with the peripheral ends 35a, 35a of the windows 35, 35 of the housing 31 of the female member 3, the checking member 5 is elastically deformed slightly, and its own elastic force acts as a force which presses the first engaging portions 52a, 52a to the peripheral ends 35a, 35a of the windows 35, 35 of the housing 3 in a substantially perpendicular direction. As a result, the side wall of the major-diameter portion 31e, onto which the checking member 5 is installed: namely; the side wall of the major-diameter portion 31e, with which the inner surface of the letter C-shaped portion 51 is brought into pressed contact, is gripped between the first engaging portions 52a, 52a of the checking member 5 and the inner surface of the letter C-shaped portion 51 thereof in a direction perpendicular to an axial direction. Thus, the checking member 5 is held onto the housing 31 firmly and securely, and is inhibited from moving idly with respect to the housing 31. In addition, even if an operator tries to pull out the checking member 5 from the housing 31, he or she cannot carry out the pulling-out operation with ease.

Note that it is not the indispensable requirements that the cut-offs 54, 54 are formed, and that the letter C-shaped portion 51 of the checking member 5 is designed dimensionally so as to elastically deform slightly when the checking member 5 is assembled externally around and held onto the housing 31 of the female member 3. However, it is preferred to form the cut-offs 54, 54 if the letter C-shaped portion 51 is designed dimensionally so as to elastically deform slightly when the checking member 5 is assembled externally around and held onto the housing 31. When the cut-offs 54, 54 are not formed, the elastic restoring force of the letter C-shaped portion 51 acts back to the letter C-shaped portion 51 itself by way of the engagements between the first engaging portions 52a, 52a and the peripheral ends 35a, 35a of the windows 35, 35 so that the letter C-shaped portion 51 is enlarged diametrically. As a result, the checking member 5 is likely to come off from the housing 31.

Moreover, note that, in the checking member 5 of the connector according to the First Preferred Embodiment, the both side surfaces are formed as tapered surfaces 55, 55 on the leading-end side of the engagement convexities 52, 52 as illustrated in FIG. 5. The tapered surfaces 55, 55 reduce the interval therebetween as they approach their leading ends. Therefore, the ring-shaped convexity 1a of the male member 1 is slid and guided on the tapered surfaces 55, 55, and accordingly it is likely to go into the inner side with respect to the leading-end contacting portions 52b, 52b. Thus, the ring-shaped convexity 1a makes the leading-end contacting portions 52b, 52b likely to move outwardly in a radial direction.

Figure 3:
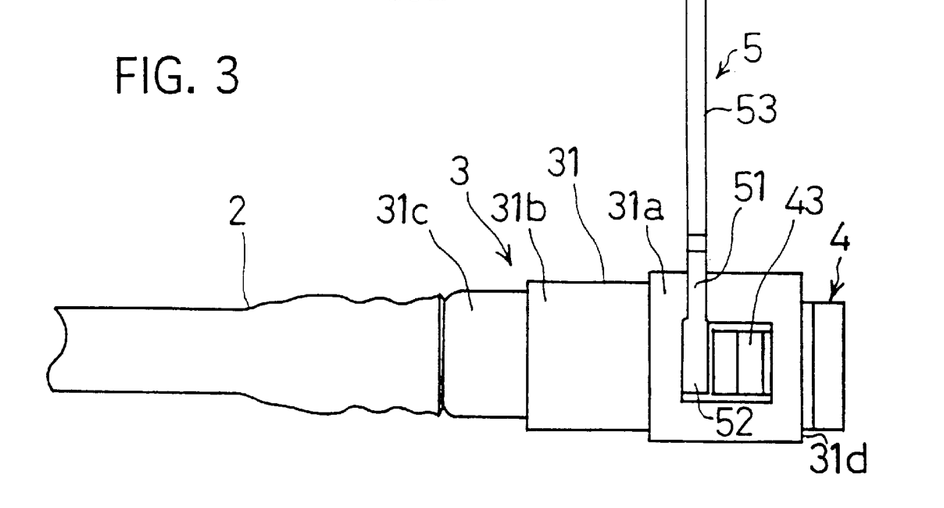
FIG. 3 is concerned with the First Preferred Embodiment of the present connector, and is a side view of the female member.

As illustrated in FIGS. 1 through 3, in the connector according to the First Preferred Embodiment, the checking member 5 is assembled externally around and held onto the outer peripheral surface of the housing 31 of the female member 3 in a direction perpendicularly to an axial direction before the male member 1 is connected with the female member 3. At this moment, the engagement convexities 52, 52 of the checking member 5 are respectively fitted into the housing 31 through the windows 35, 35 at positions which are disposed on a further axially inner side in the housing 31 with respect to the engagement ends 43b, 43b of the claws 43, 43 of the engagement member 4. At the same time, the first engaging portions 52a, 52a of the engagement convexities 52, 52 are respectively engaged with the peripheral ends 35a, 35a of the windows 35, 35 of the housing 31. Thus, the checking member 5 can be securely inhibited from being pulled out from the housing 31 in a direction perpendicular to an axial direction, because the first engaging portions 52a, 52a of the engagement convexities 52, 52 of the checking member 5 are engaged with the peripheral ends 35a, 35a of the windows 35, 35 of the housing 31. In this instance, it is impossible for an operator to try pulling out the checking member 5 from the housing 31 in a direction perpendicular to an axial direction. Moreover, under the circumstances, the leading-end contacting portions 52b, 52b of the engagement convexities 52, 52 of the checking member 5 are positioned within the locus of the ring-shaped convexity 1a of the male member 1 during the fitting of the male member 1.

Subsequently, when the fitting end 1c of the male member 1 is fitted into the housing 31 of the female member 3 through the fitting opening end 31d thereof, the ring-shaped convexity 1a of the male member 1 presses and slides on the inclined inner surfaces 43a, 43a of the claws 43, 43 of the engagement member 4 to enlarge the claws 43, 43 outwardly in a radial direction against their elasticity. Thereafter, the ring-shaped convexity 1a goes into the housing 31 beyond the claws 43, 43. Consequently, the claws 43, 43 restore to their original configuration inwardly in a radial direction so that the engagement ends 43b, 43b of the claws 43, 43 are engaged with the ring-shaped convexity 1a. As a result, the male member 1 and the female member 3 are put into the connected state by way of the engagement member 4.

As illustrated in FIGS. 9 and 10, when the fitting of the male member 1 is completed, the leading-end contacting portions 52b, 52b of the engagement convexities 52, 52 of the checking member 5, which have been positioned within the locus of the ring-shaped convexity 1a of the male member 1, are pressed by the ring-shaped convexity 1a of the male member 1 to move outwardly in a radial direction, respectively. Accordingly, the letter C-shaped portion 51 of the checking member 5 is enlarged diametrically. When the letter C-shaped portion 51 is enlarged diametrically, the inclined second engaging portions 52c, 52c are brought into contact with and engaged with the peripheral edges 35b, 35b of the windows 35, 35 of the housing 31 of the female member 3, respectively. Thus, the elastic restoring force of the letter C-shaped portion 51 can securely inhibit the checking member 5 from coming off from the housing 31 in a direction perpendicular to an axial direction, because the inclined second engaging portions 52c, 52c are engaged with the peripheral edges 35b, 35b of the windows 35, 35.

Under the circumstances, when an operator tries to pull out the checking member 5 from the housing 31 of the female member 3, the inclined second engaging portions 52c, 52c of the engagement convexities 52, 52 of the checking member 5 are brought into slidable contact with the peripheral edges 35b, 35b of the windows 35, 35 of the housing 31, and thereby the letter C-shaped portion 51 of the checking member 5 is further enlarged diametrically. Thus, the checking member 5 can be pulled out from the housing 31 in a direction perpendicular to an axial direction. As a result, it is possible to check the connection between the male member 1 and the female member 3.

As having described so far, the connector according to the First Preferred Embodiment is free from the fear in that the checking member 5 is projected out and came off from the housing 31 of the female member 3 by the elastic restoring force after the male member 1 is connected with the female member 3. Consequently, an operator is little required to pick up the checking member 5 after completing the connection, because the checking member 5 is hardly disassembled and fallen from the housing 31. As a result, it is possible to apply the connector according to the First Preferred Embodiment to places where a come-off and fallen checking member results in troubles, and where an operator cannot pick a come-off and fallen checking member with ease.

Second Preferred Embodiment

Figure 11:
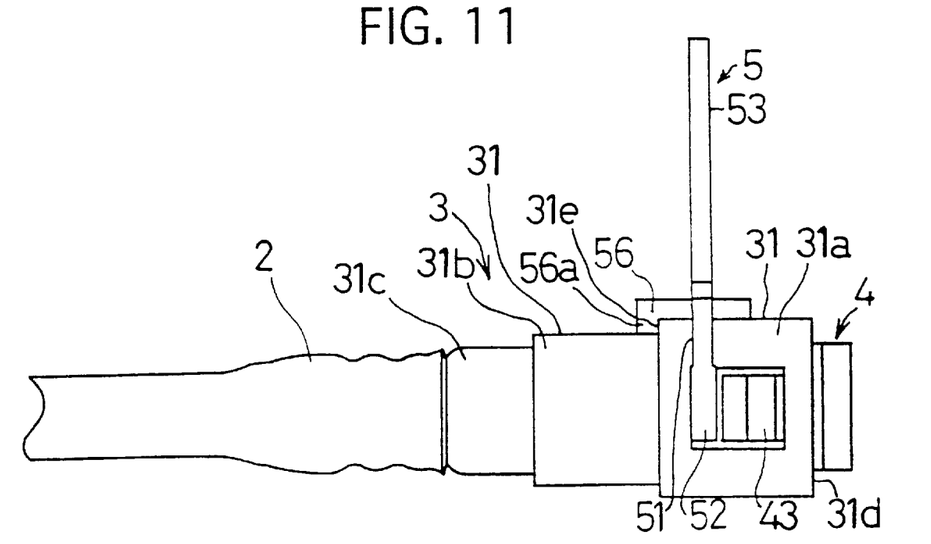
FIG. 11 is concerned with a Second Preferred Embodiment of the present connector, and is a cross-sectional view of a female member thereof before a male member thereof is fitted into the female member.
Figure 12:
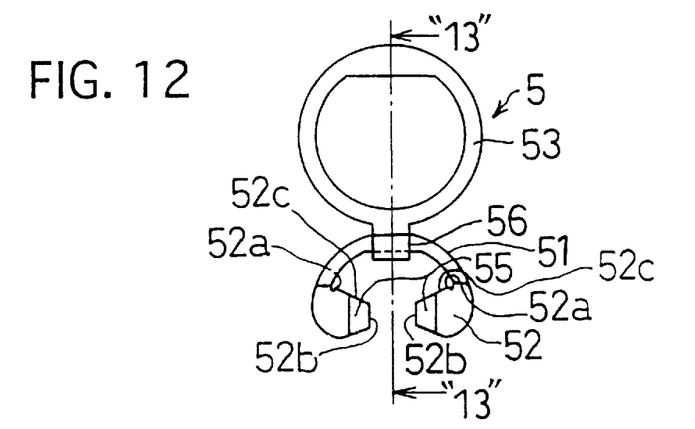
FIG. 12 is concerned with the Second Preferred Embodiment of the present connector, and is a front view of a checking member thereof.
Figure 13:
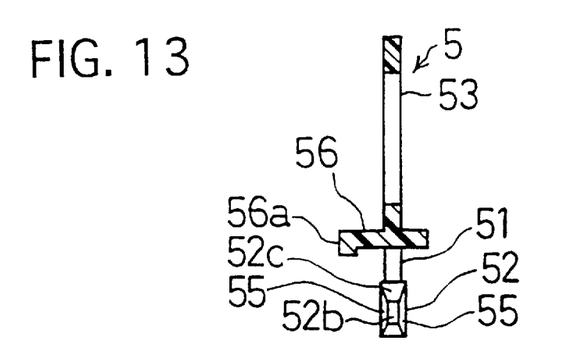
FIG. 13 is concerned with the Second Preferred Embodiment of the present connector, and is a cross-sectional view taken along arrow "13"—"13" of FIG. 12.

A connector according to a Second Preferred Embodiment illustrated in FIGS. 11 through 13 includes a checking member 5 which is provided with a positioning portion 56. For instance, a rod-shaped positioning portion 56 is protruded integrally from a peripheral center of a letter C-shaped portion 51 in an axial direction. As illustrated in FIG. 13, a bent portion 56a is further formed on one of the opposite sides of the positioning portion 56. As illustrated in FIG. 11, the bent portion 56a is engaged with a step 31e, which is disposed on an axially inner side of a major-diameter portion 31a of a housing 31 of a female member 3, thereby positioning the checking member 5 with respect to the housing 31 in an axial direction. Unless otherwise specified, the connector according to the Second Preferred Embodiment has the identical arrangements with those of the First Preferred Embodiment, and operates and produces advantages in the same manner as the First Preferred Embodiment.

Third Preferred Embodiment

Figure 14:
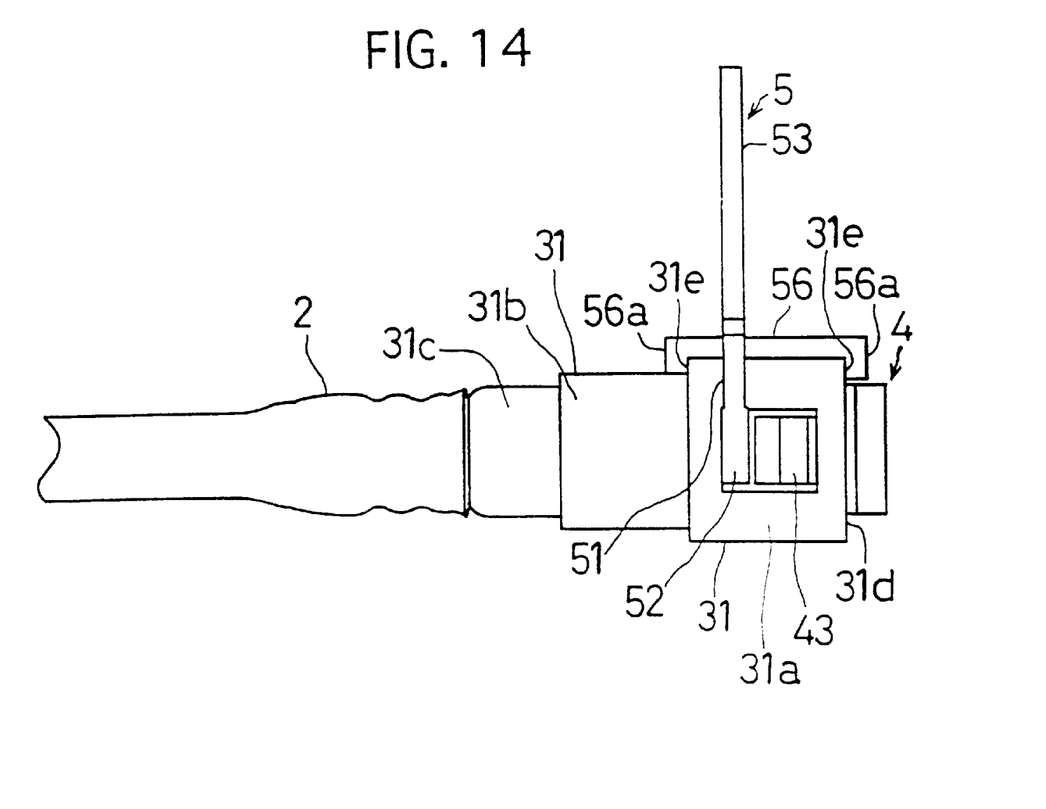
FIG. 14 is concerned with a Third Preferred Embodiment of the present connector, and is a cross-sectional view of a female member thereof before a male member thereof is fitted into the female member.

A connector according to a Third Preferred Embodiment illustrated in FIG. 14 is provided with a bent portion 56a, which is employed in the connector according to the Second Preferred Embodiment, on opposite ends of a positioning portion 56. Thus, the bent portions 56a, 56a are respectively engaged with steps 31e, 31e, which are disposed on axially opposite sides of a major-diameter portion 31a of a housing 31 of a female member 3, thereby positioning the checking member 5 with respect to the housing 31 in an axial direction. In addition, the checking member 5 can be securely inhibited from moving relatively with respect to the housing 31 in an axial direction.

Having now fully described the present invention, it will be apparent to one of ordinary skill in the art that many changes and modifications can be made thereto without departing from the spirit or scope of the present invention as set forth herein including the appended claims.

What is claimed is:

1. A connector, comprising:

a tube-shaped male member having a leading end, and a fitting end, the fitting end being provided with a ring-shaped convexity which is disposed at a position away from the leading end by a predetermined distance;

a female member having axially opposite ends, and a substantially cylinder-shaped housing disposed at one of the axially opposite ends, the housing being provided with a fitting opening end into which the fitting end of said male member is fitted, and a pair of windows which penetrate through in a radial direction and face oppositely with each other in a peripheral direction, and which has a peripheral end and a peripheral edge;

an engagement member being fitted into and held in the housing of said female member, and having a pair of claws, the claws being capable of elastically deforming in a radial direction, being disposed at positions which correspond to the windows of the housing, and being provided with an inclined inner surface and an engagement end, the inclined inner surface which is inclined inwardly in a radial direction as it extends from the fitting opening end of the housing to an axial inner side, and on which the ring-shaped convexity of said male member is pressed to slide when said male member is fitted into said female member, the engagement end which is engaged with the ring-shaped convexity of said male member so as to inhibit said male member from releasing when said male member and said female member are connected; and a checking member assembled externally around and held onto an outer periphery of the housing of said female member in a direction perpendicular to an axial direction, and having a letter C-shaped portion, and a pair of engagement convexities, the letter C-shaped portion having opposite ends, and being capable of diametrically enlarging by elastic deformation, the engagement convexities projecting inwardly from and integrally with the opposite ends of the letter C-shaped portion, and being fitted into the housing through the windows of the housing at positions which are disposed on a further axially inner side in the housing with respect to the engagement end of the claws of said engagement member;

the engagement convexities of said checking member having a first engaging portion, a leading-end contacting portion, and an inclined second engaging portion, the first engaging portion engaging with the peripheral end of the windows of the housing of said female member so as to inhibit said checking member from releasing from the housing in a direction perpendicular to an axial direction before said male member is connected with said female member, the leading-end contacting portion being positioned within a locus of the ring-shaped convexity of said male member during the fitting of said male member and before said male member is connected with said female member, being pressed by the ring-shaped convexity to move outwardly in a radial direction so as to diametrically enlarge the letter C-shaped portion of said checking member when the fitting of said male member is completed, the inclined second engaging portion engaging with the peripheral edge of the windows of the housing of said female member so as to inhibit said checking member from releasing from the housing in a direction perpendicular to an axial direction by an elastic restoring force of the letter C-shaped portion when the fitting of said male member is completed, and being inclined inwardly in a direction of the housing so as to further diametrically enlarge the letter C-shaped portion by being brought into sliding contact with the peripheral edge of the windows of the housing when said checking member is pulled out from the housing in a direction perpendicular to an axial direction after the fitting of said male member is completed, and an inner peripheral configuration of the letter C-shaped portion of said checking member being shaped complementary to an outer peripheral configuration of the housing of said female member and in engagement therewith when said first engaging portion engage said peripheral end of said windows.

2. A connector, comprising:

a tube-shaped male member having a leading end, and a fitting end, the fitting end being provided with a ring-shaped convexity which is disposed at a position away from the leading end by a predetermined distance;

a female member having axially opposite ends, and a substantially cylinder-shaped housing disposed at one of the axially opposite ends, the housing being provided with a fitting opening end into which the fitting end of said male member is fitted, and a pair of windows which penetrate through in a radial direction and face oppositely with each other in a peripheral direction, and which has a peripheral end and a peripheral edge;

an engagement member being fitted into and held in the housing of said female member, and having a pair of claws, the claws being capable of elastically deforming in a radial direction, being disposed at positions which correspond to the windows of the housing, and being provided with an inclined inner surface and an engagement end, the inclined inner surface which is inclined inwardly in a radial direction as it extends from the fitting opening end of the housing to an axial inner side, and on which the ring-shaped convexity of said male member is pressed to slide when said male member is fitted into said female member, the engagement end which is engaged with the ring-shaped convexity of said male member so as to inhibit said male member from releasing when said male member and said female member are connected; and a checking member assembled externally around and held onto an outer periphery of the housing of said female member in a direction perpendicular to an axial direction, and having a letter C-shaped portion, and a pair of engagement convexities, the letter C-shaped portion having opposite ends, and being capable of diametrically enlarging by elastic deformation, the engagement convexities projecting inwardly from and integrally with the opposite ends of the letter C-shaped portion, and being fitted into the housing through the windows of the housing at positions which are disposed on a further axially inner side in the housing with respect to the engagement end of the claws of said engagement member;

the engagement convexities of said checking member having a first engaging portion, a leading-end contacting portion, and an inclined second engaging portion, the first engaging portion engaging with the peripheral end of the windows of the housing of said female member so as to inhibit said checking member from releasing from the housing in a direction perpendicular to an axial direction before said male member is connected with said female member, the leading-end contacting portion being positioned within a locus of the ring-shaped convexity of said male member during the fitting of said male member and before said male member is connected with said female member, being pressed by the ring-shaped convexity to move outwardly in a radial direction so as to diametrically enlarge the letter C-shaped portion of said checking member when the fitting of said male member is completed, the inclined second engaging portion engaging with the peripheral edge of the windows of the housing of said female member so as to inhibit said checking member from releasing from the housing in a direction perpendicular to an axial direction by an elastic restoring force of the letter C-shaped portion when the fitting of said male member is completed, and being inclined inwardly in a direction of the housing so as to further diametrically enlarge the letter C-shaped portion by being brought into sliding contact with the peripheral edge of the windows of the housing when said checking member is pulled out from the housing in a direction perpendicular to an axial direction after the fitting of said male member is completed, the engagement convexities of said checking member further having a concave-shaped cut-off, respectively, which is disposed at a boundary between the engagement convexities and the letter C-shaped portion, and thereby a boundary between the concave-shaped cut-off and the inclined second engaging portion being made to work as the first engaging portion, said checking member and said female member being designed dimensionally so that a first distance between a first line, which connects the peripheral ends of the windows of the housing of said female member, and an outer periphery of the housing of said female member being larger than second distance between a second line, which connects the first engaging portions of the engagement convexities of said checking member, and an inner periphery of the letter C-shaped portion of said checking member.

3. A connector, comprising:

a tube-shaped male member having a leading end, and a fitting end, the fitting end being provided with a ring-shaped convexity which is disposed at a position away from the leading end by a predetermined distance;

a female member having axially opposite ends, and a substantially cylinder-shaped housing disposed at one of the axially opposite ends, the housing being provided with a fitting opening end into which the fitting end of said male member is fitted, and a pair of windows which penetrate through in a radial direction and face oppositely with each other in a peripheral direction, and which has a peripheral end and a peripheral edge;

an engagement member being fitted into and held in the housing of said female member, and having a pair of claws, the claws being capable of elastically deforming in a radial direction, being disposed at positions which correspond to the windows of the housing, and being provided with an inclined inner surface and an engagement end, the inclined inner surface which is inclined inwardly in a radial direction as it extends from the fitting opening end of the housing to an axial inner side, and on which the ring-shaped convexity of said male member is pressed to slide when said male member is fitted into said female member, the engagement end which is engaged with the ring-shaped convexity of said male member so as to inhibit said male member from releasing when said male member and said female member are connected; and a checking member assembled externally around and held onto an outer periphery of the housing of said female member in a direction perpendicular to an axial direction, and having a letter C-shaped portion, and a pair of engagement convexities, the letter C-shaped portion having opposite ends, and being capable of diametrically enlarging by elastic deformation, the engagement convexities projecting inwardly from and integrally with the opposite ends of the letter C-shaped portion, and being fitted into the housing through the windows of the housing at positions which are disposed on a further axially inner side in the housing with respect to the engagement end of the claws of said engagement member;

the engagement convexities of said checking member having a first engaging portion, a leading-end contacting portion, and an inclined second engaging portion, the first engaging portion engaging with the peripheral end of the windows of the housing of said female member so as to inhibit said checking member from releasing from the housing in a direction perpendicular to an axial direction before said male member is connected with said female member, the leading-end contacting portion being positioned within a locus of the ring-shaped convexity of said male member during the fitting of said male member and before said male member is connected with said female member, being pressed by the ring-shaped convexity to move outwardly in a radial direction so as to diametrically enlarge the letter C-shaped portion of said checking member when the fitting of said male member is completed, the inclined second engaging portion engaging with the peripheral edge of the windows of the housing of said female member so as to inhibit said checking member from releasing from the housing in a direction perpendicular to an axial direction by an elastic restoring force of the letter C-shaped portion when the fitting of said male member is completed, and being inclined inwardly in a direction of the housing so as to further diametrically enlarge the letter C-shaped portion by being brought into sliding contact with the peripheral edge of the windows of the housing when said checking member is pulled out from the housing in a direction perpendicular to an axial direction after the fitting of said male member is completed, and said checking member further having a positioning portion for positioning said checking member with respect to the housing of said female member, said housing having a portion having opposite ends and said positioning portion protruding integrally from a peripheral center of the letter C-shaped portion, and said positioning portion having opposite ends and a bent portion disposed at one of the opposite ends of the positioning portion engaging with one of the opposite ends of said portion of said housing.

4. The connector according to claim 3, wherein the positioning portion of said checking member further has another bent portion which is disposed at another one of the opposite ends of the positioning portion to engage with another one of the opposite ends of said portion of said housing.

* * * * *